US00RE33951E

United States Patent [19]

Junkers

[11] E Patent Number: Re. 33,951

[45] Reissued Date of Patent: Jun. 9, 1992

[54] FLUID OPERATED WRENCH

[76] Inventor: John K. Junkers, 7 Arrowhead La., Saddle River, N.J. 07458

[21] Appl. No.: 573,813

[22] Filed: Aug. 28, 1990

Related U.S. Patent Documents

Reissue of:

[64] Patent No.: 4,825,730
Issued: May 2, 1989
Appl. No.: 102,914
Filed: Sep. 29, 1987

[51] Int. Cl.[5] ..... B25B 13/46

[52] U.S. Cl. ..... 81/57.39; 81/57.36; 81/163

[58] Field of Search ..... 81/57.39, 57.24, 57.35, 81/57.36, 57.43, 62, 63

[56] References Cited

U.S. PATENT DOCUMENTS 4,631,990 12/1986 Hughes ..... 81/62
4,706,527 11/1987 Junkers ..... 81/57.39

*Primary Examiner*—M. Rachuba
*Attorney, Agent, or Firm*—Michael J. Striker

[57] ABSTRACT

A fluid operated wrench for tightening and loosening threaded connectors comprises a housing having a first axis, a drive arranged in the housing and providing a driving force in an axial direction, an engaging unit of one type provided in a polygonal opening for engaging respective threaded connector to be turned and an engaging unit of another type provided with connecting means for attaching exchangeable socket projections thereto made to engage respective threaded connector to be turned and both including an engaging element connected with the drive for turning about a second axis which is transverse to the first axis, the engaging units being mounted exchangeably so that the engaging units of one type can be removed and replaced by the engaging units of another type or vice versa, a structure in the housing for exchangeably mounting the engaging units so that the engaging unit of one type can be removed and replaced by the engaging unit of another type and vice versa, and a unit for providing reaction in a first portion in the plane of the engaging unit of one type so as to abut against one neighboring threaded connector and in a second position perpendicular to the first position to abut against one neighboring threaded connector when the engaging unit of another type is mounted.

6 Claims, 5 Drawing Sheets

FIG. 3
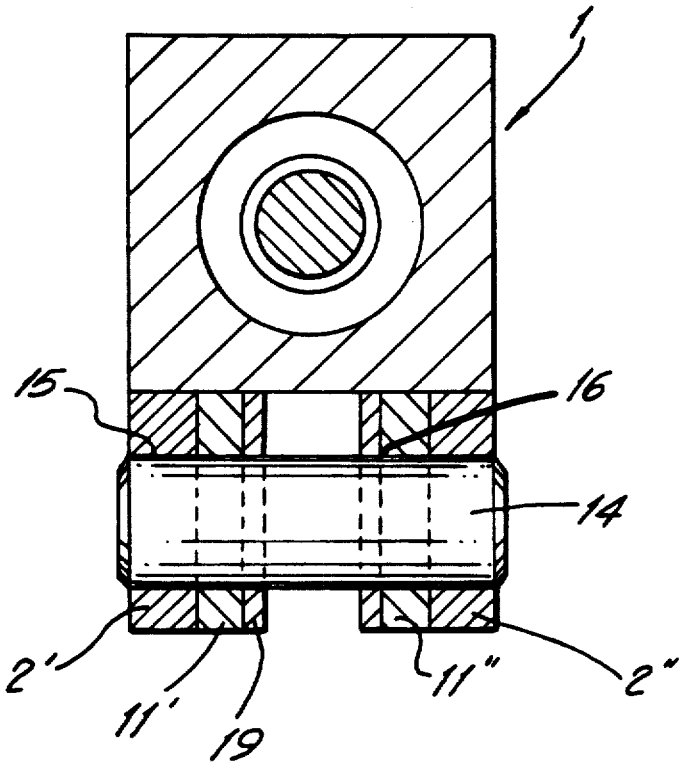
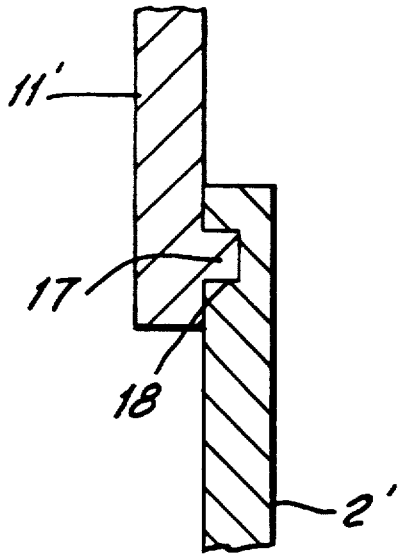
FIG. 4

FLUID OPERATED WRENCH

Matter enclosed in heavy brackets [ ] appears in the original patent but forms no part of this reissue specification; matter printed in italics indicates the additions made by reissue.

BACKGROUND OF THE INVENTION

The present invention relates to a fluid operated wrench for tightening and loosening of threaded connectors.

Fluid operated wrenches of the above mentioned general type are known in the art. Basically there are two types of fluid operated wrenches which are specific to respective works and conditions of their use. A separate drive-type fluid operated wrench as a working element which is formed as a square projection, and exchangeable sockets are attached to the projection so as to tighten or loosen respective threaded connectors. These tools cannot however operate in limited clearance areas in which space is too narrow for inserting a socket. In such areas a limited-clearance fluid operated wrench is used which as a rule is very flat and has a working element provided with a hexagonal opening for engaging respective threaded connectors. Each of the above described wrenches is satisfactory for performing the respective works in respective areas. The disadvantage however of this approach is that a consumer must have two different tools for the abovementioned two different applications.

SUMMARY OF THE INVENTION

Accordingly, it is an object of the present invention to provide a fluid operated wrench which avoids the disadvantages of the prior art.

More particularly, it is an object of the present invention to provide a fluid operated wrench which can be used both in regular areas and in limited clearance areas.

In keeping with these objects and with others which will become apparent hereinafter, one feature of the present invention resides, briefly stated, a fluid operated wrench for tightening and loosening a threaded connector, which comprises a housing,having a first axis, drive means arranged in the housing and providing a driving force in an axial direction, engaging means of one type provided with a polygonal opening for engaging respective threaded connector to be turned and engaging means for attaching exchangeable socket projections thereto made to engage respective threaded connector to be turned and both including an engaging element connectable with the drive means for turning about a second axis which is transverse to the first axis, the engaging means being mounted exchangeably so that the engaging means of one type can be removed and replaced by to the engaging means of another type or vice versa, means [in the housing] for [ecxhangeably] *exchangeably* mounting the engaging means so that the engaging means of one type can be replaced by engaging means of another type and vice versa, means providing reaction in a first position in the plan of to the engaging means of one type so as to abut against one neighboring threaded connector when the engaging means of one type is mounted, and in a second position perpendicular to said first position to abut against one neighboring object threaded connector when the engaging means of another type is mounted.

When the fluid operated wrench is designed in accordance with the present invention it becomes a universal tool which can be used both in regular (relatively wide) areas and also in limited clearance (narrow) areas. No longer is it necessary for a consumer to have two different tools to perform the respective works in respective areas.

The novel features which are considered as characteristic for the invention are set forth in particular in the appended claims. The invention itself, however, both as to its construction and its method of operation, together with additional objects and advantages thereof, will be best understood from the following description of specific embodiments when in connection with the accompanying drawings.

BRIEF DESCRIPTION OF THE DRAWINGS

FIG. 1b is a plan view of the fluid operated wrench of FIG. 1a;

FIG. 3 is a view showing a section taken along the line III—III in FIG. 1; and FIG. 4 is a section taken along the line IV—IV in FIG. 1.

DESCRIPTION OF THE PREFERRED EMBODIMENTS

Figure 1:
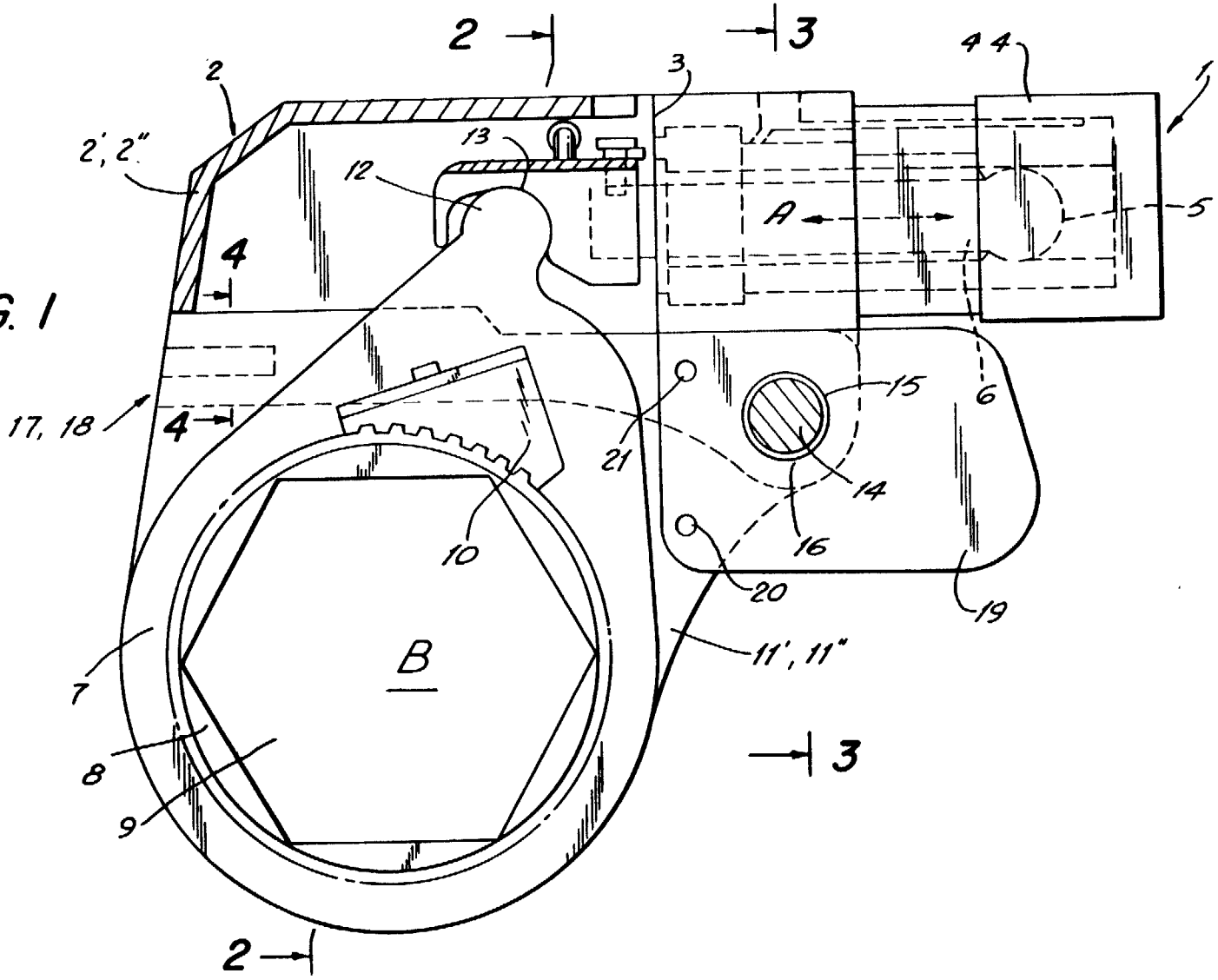
FIG. 1 is a side view of the fluid operated wrench in accordance with the present invention.

A fluid operated wrench in accordance with the present invention has a housing which is subdivided into two housing portions identified with reference numerals 1 and 2. The housing portions 1 and 2 adjoin each other along a dividing plane identified with reference numeral 3. It is to be understood that the housing portions 1 and 2 can be formed as individual parts and then connected with one another, for example by welding along the dividing plane 3. On the other hand, the housing portions 1 and 2 can be originally made as a one-piece member in which case the dividing plane 3 is just an imaginary plane. The housing 1 accommodates a drive which is formed as a cylinder-piston unit. The cylinder-piston unit has a cylinder 4 which forms an inner chamber, and the piston 5 which is movable in the inner chamber of the cylinder 4 under the action of fluid, for example, a hydraulic or pneumatic medium, admitted into the inner chamber in the respective side of the piston 5. The piston is connected with a piston rod 6 which extends in an axial direction beyond the housing portion 1 into the housing portion 2.

An engaging unit for engaging and turning a threaded connector is further provided and connected with the drive unit in a manner which will be described in detail hereinbelow. The engaging unit includes a link which is identified with reference numeral 7 and has a central opening, and an engaging member which is formed for example as a ratchet wheel 8 arranged in the opening of the link 7 and provided with an engaging formation. In FIG. 1 the engaging formation is formed as a hexagonal opening 9 which can engage for example a hexagonal head of a bolt or a nut. The engaging member 8 is turnably inserted into the link 7. A pawl 10 is connected with the link 7 in a known manner, for example pivotably as disclosed in U.S. Pat. No. 4,079,641. The ratchet wheel 9 and the pawl 10 are provided with interengaging projections and grooves which are formed so that when the link 7 is turned in a working direction the projections of the pawl 10 engage in the grooves of the ratchet wheel 9, while when the link is turned in an opposite direction the projections of the pawl 10 just slip over the projections of the ratchet wheel 9, as disclosed in the above-mentioned patent. Two link plates 11' and 11" are arranged at both sides of the links 7 so as to sandwich them therebetween. The link 7 has an upper end which is pivotally connected with a free end of the piston rod 6 by first connecting means. The first connecting means can be formed for example by a pin 12 which is pivotably and slidingly guided in an opening 13 formed in the free end of the piston rod 6.

In accordance with a possible embodiment of the invention, the housing portion 1 is round or square, while the housing portion 2 is formed by by two housing plates 2' and 2'. The link plates 11' and 11" are arranged between the housing plates 2' and 2" and immovably connected with one another. This connection is performed by second connecting means which can be formed by a pin 14 which extends through openings 15 in the housing plates 2' and 2" and openings 16 in the link plates 11' and 11". The above connection also includes a third connecting means formed for example by projections 17 provided on the link plates 11' and 11" and grooves 18 provided on the housing plates 2' and 2" and formed so that the projections 17 engage in the grooves 18.

As can be seen from the drawings, the projections 17 and the grooves 18 extend substantially in an asial direction of the housing.

A reaction member 19 is further provided in the fluid operated wrench. In the shown embodiment a reaction member 19 is attachable to the link 7 and the link plates 11', 11" by means of two pins 20 and 21. The reaction member 19 also has an opening 22 for receiving the pin 14 of the second connecting means.

As mentioned hereinabove, the fluid operated wrench is expecially suitable for use in different areas. For this purpose the engaging unit is mounted in the wrench exchangeably. The link 7 together with the reaction member 19 can be easily exchanged by removing the pin 14 and sliding the link plates together with the link 7, the engaging member 8, the pawl 10, and the reaction member 19 to the left along the projection 17 and the grooves 18 of the associated plates. Instead of this engaging unit, a different engaging unit can be installed in the fluid operated wrench, as will be explained in detail hereinbelow.

Figure 1A:
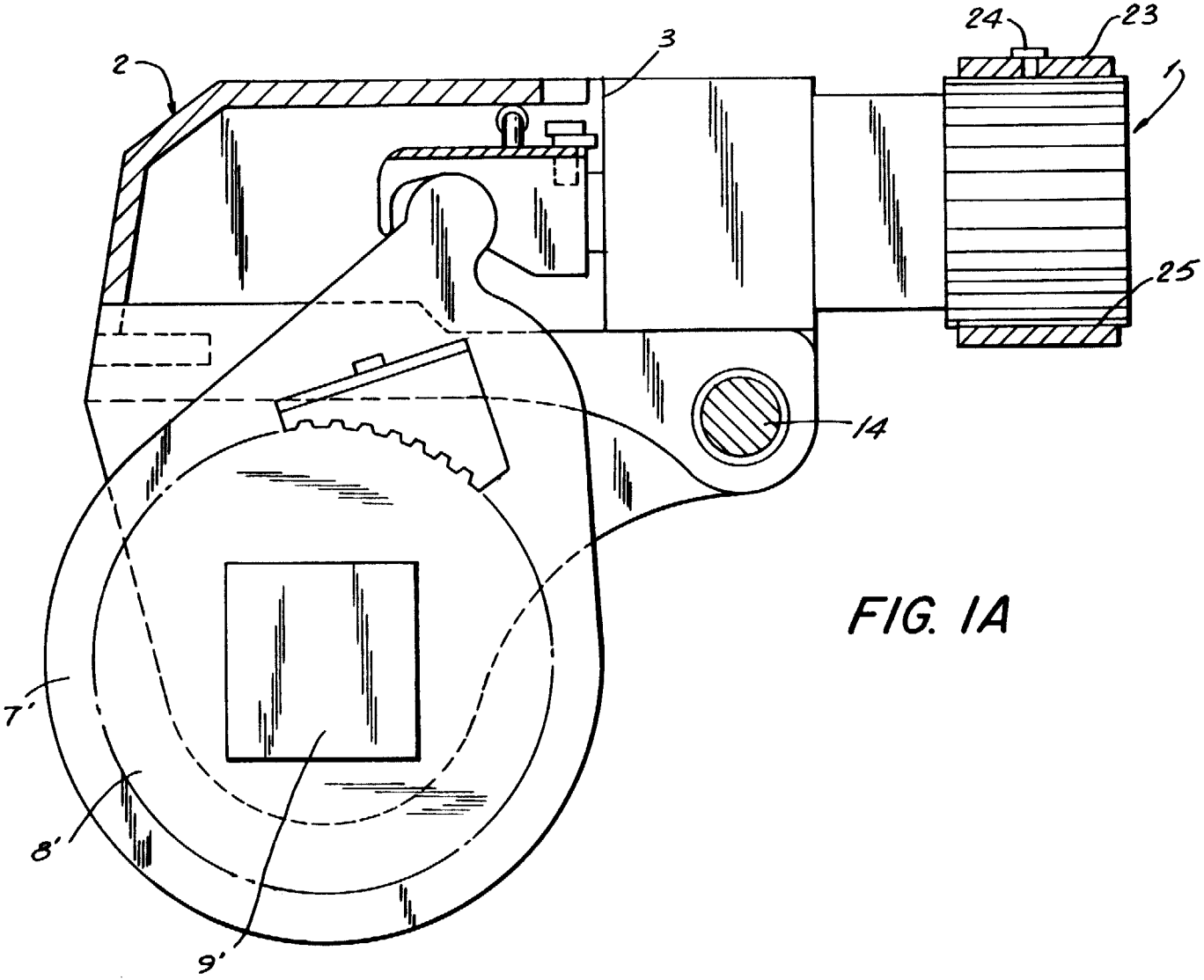
FIG. 1a is a side view substantially corresponding to the view of FIG. 1, but showing the fluid operated wrench with a different engaging member.
Figure 1B:
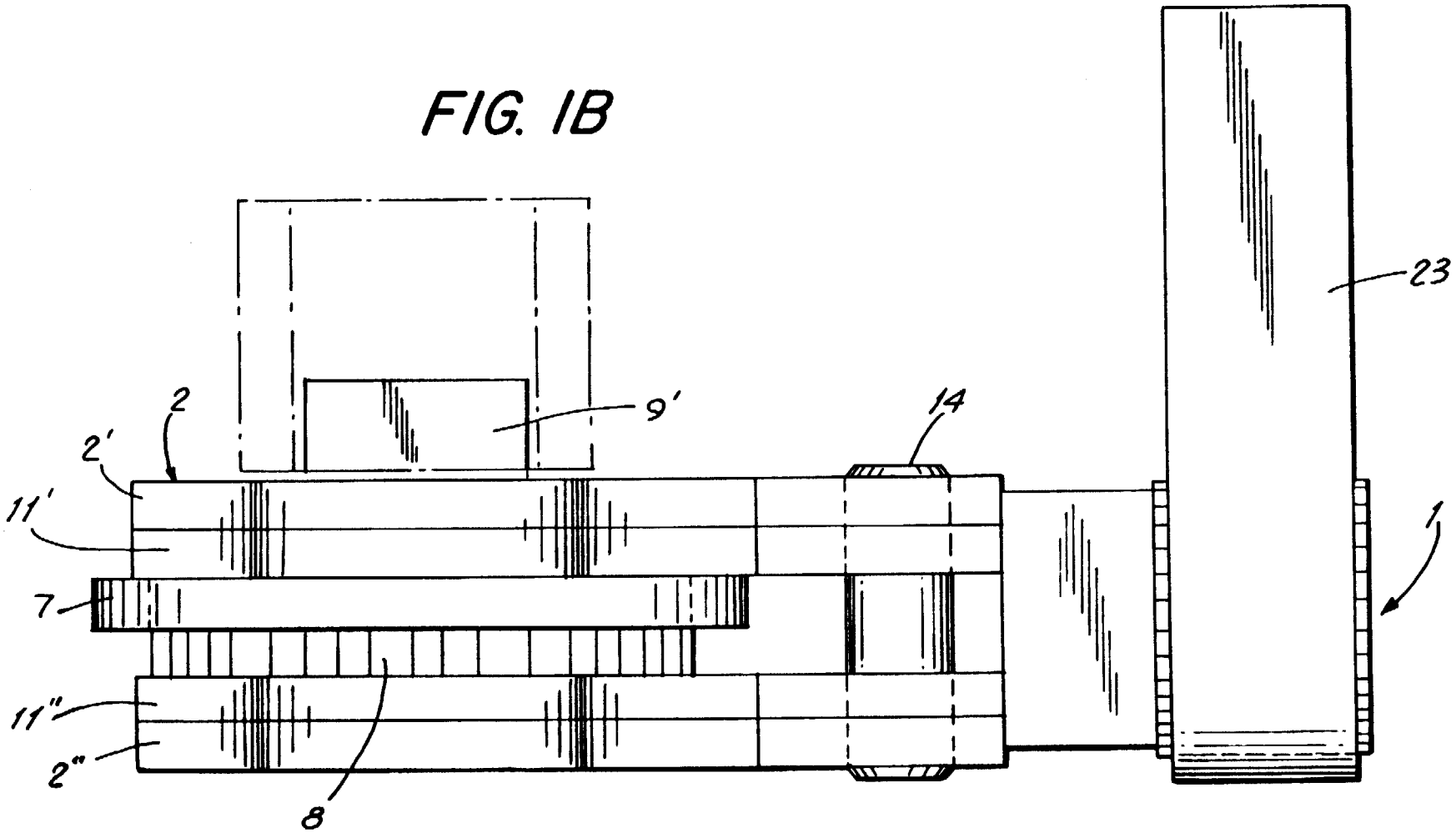
Figure 2:
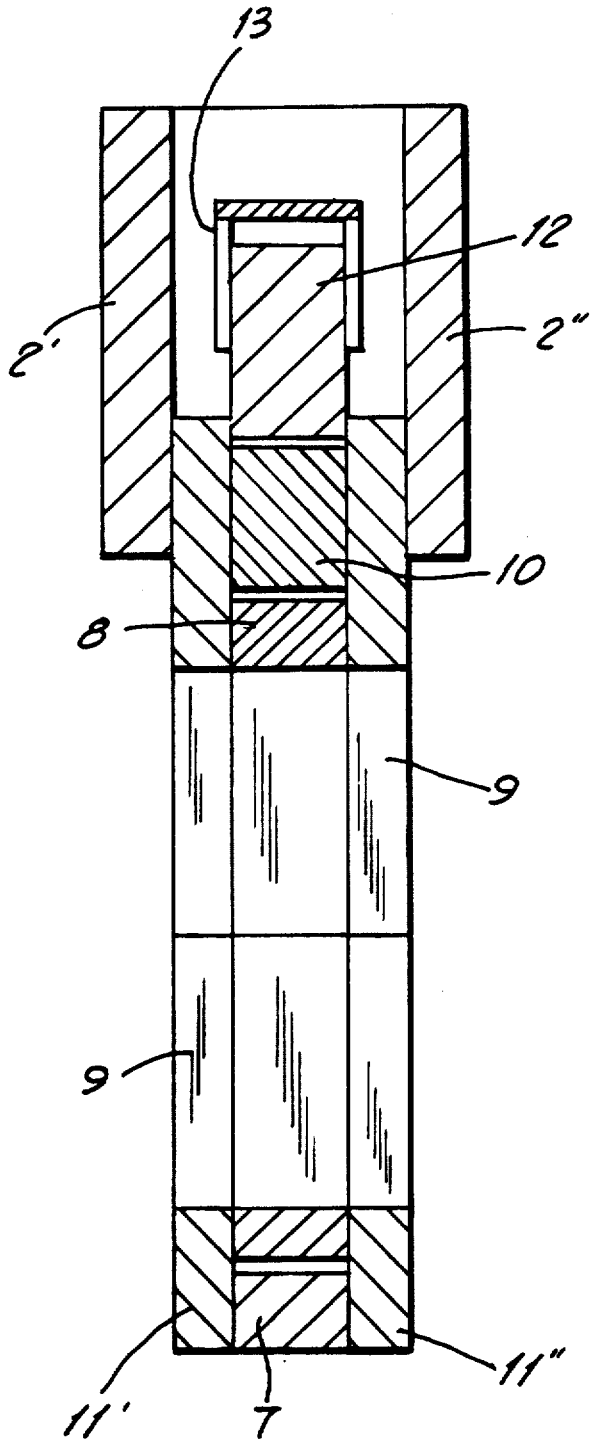
FIG. 2 is a section taken along the line II—II in FIG. 1.

The engaging unit which is shown in FIG. 1 is used for limited clearance applications or in other words for operation in very narrow spaces. For this purpose the engaging unit is flat and provided with the hexagonal opening 9. The different engaging unit which is used for operation in regular spaces which are wider is shown in FIGS. 1a and 1b. It includes a link 7' and a rachet wheel 8' provided with a square projection 9'. A plurality of exchangeable sockets can be attached to the square projection 9' for respective works. When the regular fluid operated wrench as shown in FIG. 1a is used, the reaction member has to be designed and arranged differently. This reaction member is formed as a long reaction lever 23 which is attachable to the housing portion 1 by interengaging splines 24 formed in the inner opening of the reaction lever 23 and splines 25 formed on the outer surfact of the housing portion 1. A fixing bolt 24 fixes the reaction lever 23 on the housing portion 1. During operation of the fluid operated wrench of the invention as a limited clearance tool shown in FIG. 1, the threaded connector to be tightened or loosened by the engaging member 8 is located in the same plane with a neighboring nut or bolt, against which the reaction member 19 located in the same plane with the engaging member 8 can abut. In contrast, when the fluid operated wrench of the invention is formed as a regular tool with the engaging member 9', the reaction member 23 extends substantially traversely to the axis of the cylinder-piston unit and in direction of the axis of the engaging projection 9' to reach a neighboring object located below the tool.

It is believed to be understood that when the fluid operated wrench of the invention has to be used for regular operation (not in a limited clearance area), the engaging unit shown in FIG. 1 is removed and replaced by the engaging unit shown in FIG. 1a. The same is true with respect to the abutment members, namely the abutment member 19 shown in FIG. 1 is removed, and the abutment member 23 is arranged on the wrench.

While the abutment member 19 shown in FIG. 1 is connected with the link 7 by the respective pins, it can also be made of one-piece with the link 7. Moreover, the reaction member 19 can be formed of one piece with the housing 1, 2 and remain permanently on the wrench regardless of whether the engaging member 7, 8, 9 or the engaging member 7', 8', 9' is installed in the wrench.

The fluid operated wrench in accordance with the present invention operates in the following manner:

The opening 9 or the projection 9' of the engaging member is engaged with a threaded connector to be turned, and the reaction member 19 or 23 is brought to abutment against a neighboring object. A fluid is supplied into the inner chamber of the cylinder 4 during a working stroke, so that the piston 5 is moved and the piston rod 6 is extended, or in other words displaced to the left in the drawings. In response to this displacement, the link 7 or 7' turns counterclockwise, thus turning the pawl 10 which with its projections engaging into the grooves of the ratchet wheel turns the engaging member 8 or 8' with the opening 9 or the projection 9'. The opening 9 or a socket arranged on the projection 9' turns the threaded connector about an axis B in a counterclockwise direction. During a return stroke of the piston 5 the projections of the pawl member 10 just slip over the projections of the engaging member.

It will be understood that each of the elements described above, or two or more together, may also find a useful application in other types of constructions differing from the types described above.

While the invention has been illustrated and described as embodied in a fluid operated wrench for tightening and loosening a threaded connector, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A fluid operated wrench for tightening and loosening threaded connectors, comprising a housing having a first axis; drive means arranged in said housing and providing a driving force in an axial direction; engaging means of one type provided with a polygonal opening for engaging respective threaded connector to be turned and engaging means of another type provided with connecting means for attaching exchangeable socket projections thereto made to engage respective threaded connector to be turned and both including an engaging element connectable with said drive means for turning about a second axis which is transverse to said first axis, said engaging means being mounted exchangeably so that said engaging means of one type can be removed and replaced by said engaging means of another type or vice versa; means [in said housing] for exchangeably mounting said engaging means so that said engaging means of one type can be removed and replaced by said engaging means of another type and vice versa; means providing reaction in a first position in the plane of said engaging means of one type so as to abut against one neighboring threaded connector when said engaging means of one type is mounted, and in a second position perpendicular to said first position to abut against one neighboring threaded connector when said engaging means of another type is mounted, said means providing a reaction including one reaction unit arranged to abut against one neighboring threaded connector when said engaging means of one type is mounted, and another reaction unit arranged to abut against one neighboring threaded connector when said engaging means of another type is mounted; and one holding means on said housing for holding said one reaction unit when said engaging means of one type is mounted, and another holding means on said housing for holding the other reaction unit when said engaging means of another type is mounted.

2. A fluid operated wrench as defined in claim 1, wherein at least one of said reaction units is connected with a respective one of said engaging means and is exchangeable together with the latter.

3. A fluid operated wrench as defined in claim 1, wherein at least one of said holding means is formed so that a respective one of said reaction units is removably held by said at least one holding means.

4. A fluid operated wrench is defined in claim 1, wherein said one reaction unit which abuts against one neighboring threaded connector when said engaging means of one type is mounted is formed as a plate extending substantially in said axial direction.

5. A fluid operated wrench as defined in claim 4, wherein said other reaction unit which abuts against one neighboring threaded connector when said engaging means of another type is mounted is formed as an elongated reaction lever extending transversely to said first axis of said housing.

6. A fluid operated wrench as defined in claim 1, wherein each of said engaging means includes a link which is operatively connected with said drive means so as to be directly driven by the latter, a ratchet wheel turnably mounted in said link and provided with said polygonal opening or said connecting means respectively for engaging a threaded connector, and a pawl connected with said link and cooperating with said ratchet so as to turn the latter in response to turning of said link by said drive means, said engaging means of said one type being removable and replaceable by said engaging means of said other type as a whole by removing and replacing a respective one of said links, ratchet wheels and pawls together.

* * * * *